United States Patent Office 2,810,957
Patented Oct. 29, 1957

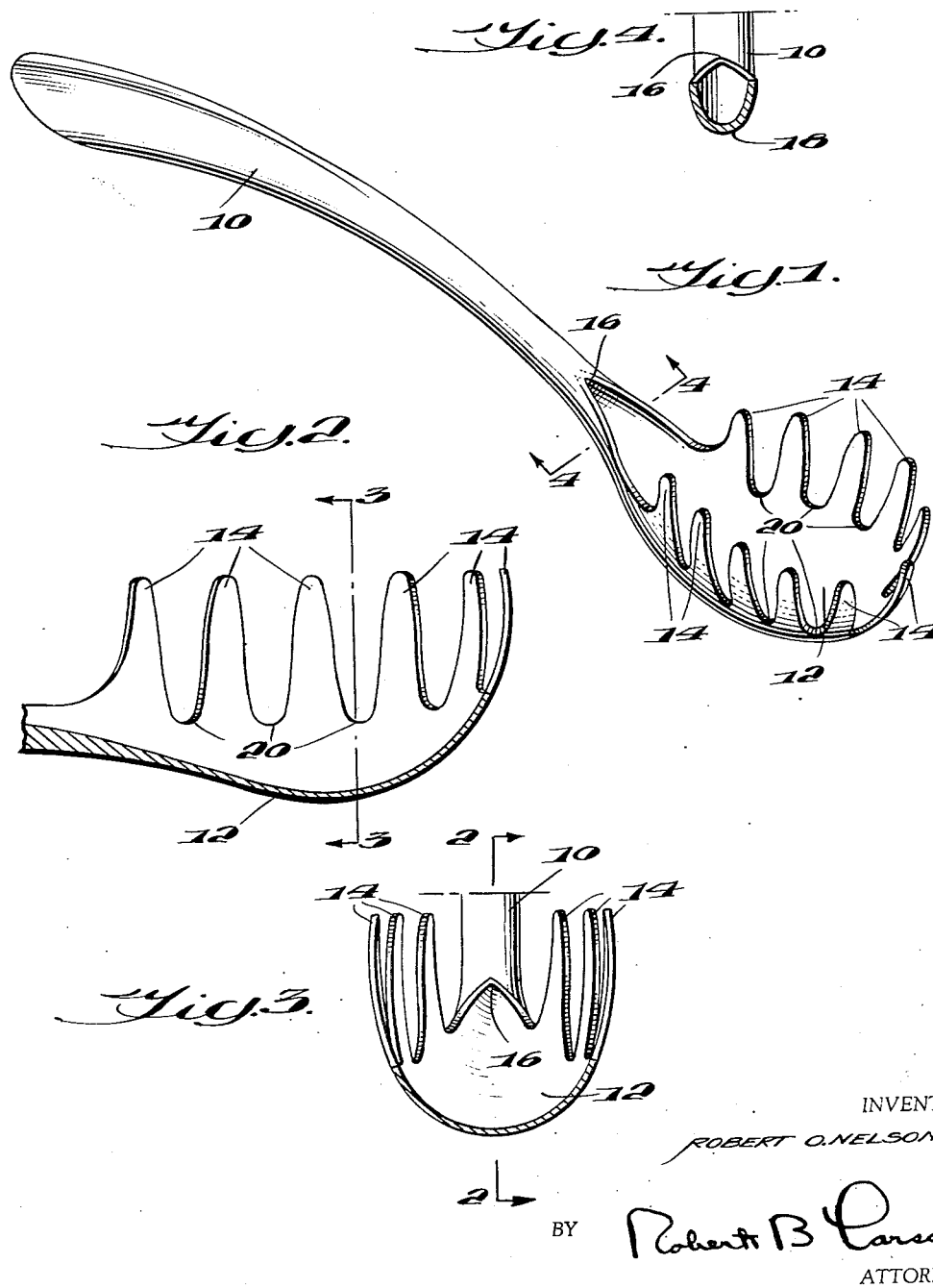

2,810,957

FOOD SERVING UTENSIL

Robert O. Nelson, Chicago, Ill., assignor to Cameron Incorporated, Chicago, Ill., a corporation of Illinois Application September 30, 1954, Serial No. 459,264

2 Claims. (Cl. 30—324)

This invention relates to a food serving device and more particularly to a food serving device which performs the various functions of a spoon, a ladle and a fork.

Food serving devices are well known in the art and most have been designed to perform a specific function. For example, there are many designs for ladles which are used to serve particular types of liquid foods. There have been many designs for forks for serving such foods as spaghetti, tossed salads and the like. There are also many designs for spoons having particular designated functions.

In many cases, each of these utensils is satisfactory for use in a particular serving operation but is useless in many other operations. If a housewife is to prepare and serve a wide variety of foods, it becomes necessary for her to have her utensil drawer cluttered with a great many serving utensils, each designed for special types of foods.

It is the object of the present invention to provide a serving utensil which is admirably suited for serving a wide variety of dishes in which the foods take many different forms. For example, the device of the present invention will effectively handle spaghetti, macaroni, tossed salads, sauerkraut (with or without the juice), cooked vegetables such as beans, corn, peas and the like.

This object is realized through the specific design of the combination including the handle, bowl and tines. A particular feature of this design is the use of a bowl which is concave in combination with wide tines of the utensil. This arrangement permits the utensil to be used not only with stringy foods such as spaghetti, sauerkraut and spinach but also permits the utensil to be used with foods having juices associated with them.

A further object of the invention resides in the specific design of the tines which are wide and spaced relatively closely together and which form continuations of the walls of the bowl. This particular combination permits all types of vegetables and other foods to be lifted and actually retained by the wide tines. The particular relationship of the tines to the bowl permits all parts of the food containing vessels to be reached so that all of the food can be removed from the vessel. Further, the rather wide tines and their relationship to each other greatly facilitate the retention of vegetables such as beans, corn, peas and other such foods.

These objects and important features of the invention will become more readily apparent from the following detailed description of the invention taken in conjunction with the accompanying drawings in which:

Fig. 1 is a perspective view of the utensil according to the invention,

Fig. 2 is a fragmentary sectional view along lines 2—2 of Fig. 3,

Fig. 3 is a fragmentary sectional view along lines 3—3 of Fig. 2, and

Fig. 4 is a cross sectional view taken along lines 4—4 of Fig. 1.

The invention in its preferred form is made from a clear plastic although silver or the like can be used.

The utensil comprises a handle 10 and integral therewith a bowl 12. Integral with the bowl are a plurality of tines 14.

The handle is formed with a flat surface on the back thereof and a convex surface on the front. At the location indicated at 16 the concave surface splits and the beginning of the bowl is formed so that there is a smooth continuous mergence of the surface of the bowl with the handle. Likewise, at that location 16 the flat back surface of the handle changes to a convex surface shown at 18 in Fig. 4 which merges smoothly with the underside of the bowl.

The bowl is so formed as to be convex as shown in Figs. 2 and 3. The tines 14 actually are continuations of the walls of the bowl. The bases of the tines are connected to each other by the smooth curves 20. With this arrangement for joining the tines to the bowl, there is a complete absence of any sharp crevices or corners in which food might be liable to collect and which would be difficult to clean.

The tines themselves are rather wide varying from 3/16 of an inch near the outer tip to 3/8 of an inch at the base. The tines are spaced from each other by approximately 1/2 inch between adjacent edges at the tips and 1/4 inch at the base.

The particular arrangement and shape of the tines and their cooperation with the bowl is particularly important for a serving utensil which is adaptable to all types of foods as described above. For example, in the handling of peas which have been cooked in a liquid, the utensil can pick up a bowl full of peas and then the tips of the tines be held against the side walls of the container while the juices are permitted to drain. On the other hand, sauerkraut can be handled very effectively particularly when it is desired to serve a certain amount of juice with the sauerkraut. The juice is retained in the bowl while the tines, as can readily be seen, will effectively handle an ample portion of kraut.

In the handling of spaghetti, for example, the spaghetti is very readily lifted out of the container in considerable quantities. The server additionally will be quite suitable for serving the meat sauce if it is of a fairly pasty consistency. The utensil also is well suited, because of its particular design, for lifting boiled potatoes out of the cooking vessel. The substantial height of the tines prevents the potato from rolling off the utensil as is many times the case with an ordinary tablespoon. The curve at the tip of the tines permits the utensil to handle the potato easily without chipping away portions of it. The cooperation of the tines and bowl against the wall of the potato permits the potato water to be drained before the potato is placed on the plate.

Other uses of the utensil should now be readily apparent as well as its obvious advantages as an almost universal serving tool.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

I claim:

1. A food serving utensil comprising a handle, means forming a concave bowl of substantial depth integral with one end of said handle, and tines integral with the sides of said bowl and further forming a continuous rounded contour with said sides, said tines extending substantially normal to a plane tangent to the concave lowermost portion of said bowl.

2. A food serving utensil as claimed in claim 1 wherein the tines are rounded at their upper edge and are of greater length than the depth of the bowl, and wherein the portion of the sides of the bowl between the tines has a concave rounded upper edge.

References Cited in the file of this patent

UNITED STATES PATENTS

| | | |
|---|---|---|
| 675,475 | Glover | June 4, 1901 |
| 885,444 | Cram | Apr. 21, 1908 |
| 1,882,665 | Innes | Oct. 18, 1932 |
| 2,338,007 | Morris | Dec. 28, 1943 |
| 2,647,310 | Yolles | Aug. 4, 1953 |

FOREIGN PATENTS

| | | |
|---|---|---|
| 374,328 | France | June 10, 1907 |